(12) United States Patent
Jung et al.

(10) Patent No.: US 9,477,883 B2
(45) Date of Patent: Oct. 25, 2016

(54) METHOD OF OPERATING HANDWRITTEN DATA AND ELECTRONIC DEVICE SUPPORTING SAME

(71) Applicant: Samsung Electronics Co., Ltd., Suwon-si, Gyeonggi-do (KR)

(72) Inventors: In Hyung Jung, Gumi-si (KR); Hyun Soo Kim, Daegu (KR); Jong Wu Baek, Gumi-si (KR); Tae Hwan Wi, Suwon-si (KR); Cheong Jae Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/596,642

(22) Filed: Jan. 14, 2015

(65) Prior Publication Data

US 2015/0206005 A1    Jul. 23, 2015

(30) Foreign Application Priority Data

Jan. 22, 2014   (KR) ........................ 10-2014-0007872

(51) Int. Cl.
*G06K 9/00* (2006.01)
*G06F 3/0488* (2013.01)
*H04M 1/725* (2006.01)

(52) U.S. Cl.
CPC ....... *G06K 9/00402* (2013.01); *G06F 3/04883* (2013.01); *H04M 1/72552* (2013.01)

(58) Field of Classification Search
None
See application file for complete search history.

(56) References Cited

U.S. PATENT DOCUMENTS

| | | | |
|---|---|---|---|
| 6,697,524 B1* | 2/2004 | Arai | G06K 9/222 345/467 |
| 7,120,320 B2* | 10/2006 | Petterson | G06K 9/222 345/179 |
| 9,013,428 B2* | 4/2015 | Asano | G06F 3/041 345/173 |
| 2001/0048436 A1* | 12/2001 | Sanger | G06F 17/214 345/467 |
| 2014/0152543 A1* | 6/2014 | Hirabayashi | G06F 3/1462 345/156 |
| 2014/0171153 A1* | 6/2014 | Kienzle | G06F 3/0237 455/566 |
| 2015/0116284 A1* | 4/2015 | Black | G06F 3/0321 345/179 |

FOREIGN PATENT DOCUMENTS

KR    10-2010-0103274 A    9/2010

OTHER PUBLICATIONS

Computer English Translation of Japanese Patent No. JP, 2008-117190, pp. 1-12.*

* cited by examiner

*Primary Examiner* — Daniel Mariam
(74) *Attorney, Agent, or Firm* — Jefferson IP Law, LLP (57) ABSTRACT

An electronic device is provided. The electronic device includes a display module configured to generate an event corresponding to a handwritten data input and a control module configured to recognize a stroke of handwritten data, collect input time information on at least one stroke and store or transmit a message including stroke related information and the input time information.

14 Claims, 7 Drawing Sheets

METHOD OF OPERATING HANDWRITTEN DATA AND ELECTRONIC DEVICE SUPPORTING SAME

CROSS-REFERENCE TO RELATED APPLICATION(S)

This application claims the benefit under 35 U.S.C. §119(a) of a Korean patent application filed on Jan. 22, 2014 in the Korean Intellectual Property Office and assigned Serial number 10-2014-0007872, the entire disclosure of which is hereby incorporated by reference.

TECHNICAL FIELD

The present disclosure relates to handwritten data on an electronic device.

BACKGROUND

Together with the recent development of digital technology, various electronic devices that are capable of communication and processing personal information on the move, such as mobile communication terminals, Personal Digital Assistants (PDAs), electronic notes, smart phones, and tablet Personal Computers (PCs) have been released. Such electronic devices do not remain confined to their respective traditional unique areas but are reaching a mobile convergence stage in which they include technology areas traditionally the domain of other terminals.

The electronic devices have supported handwriting functions for inputting characters.

Handwriting functions of typical electronic devices enable users to use their fingers or electronic pens to capture and store information input on a display module. Also, typical electronic devices transmit captured handwriting input data to other electronic devices. Thus, typical electronic devices have limitations in that they need a data storage space larger than a certain size when storing information related to handwriting input data and need a transmit quota greater than a certain size. Also, typical electronic devices have limitations in that they do not properly provide feelings or moods when users input information, because the electronic devices simply display captured handwriting input data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of operating handwritten data enabling information to be transferred with various feelings by adding information on an input time to handwritten data, and an electronic device supporting same.

Another aspect of the present disclosure is to provide a method of operating handwritten data enabling a system resource to be efficiently used for storing or transmitting handwritten data and, an electronic device supporting same.

In accordance with an aspect of the present disclosure, an electronic device is provided. The electronic device includes a display module configured to generate an event corresponding to a handwritten data input and a control module configured to recognize a stroke of handwritten data, collect input time information on at least one stroke and one of store and transmit a message including stroke-related information and the input time information.

In accordance with an aspect of the present disclosure, an electronic device is provided. The electronic device includes a communication module configured to receive a message comprising information on at least one stroke included in handwritten data, and input time information on each stroke, a control module configured to display each of strokes based on the input time information, and a display module configured to display the strokes.

In accordance with an aspect of the present disclosure, a method of operating handwritten data is provided. The method includes collecting stroke information on handwritten data, and input time information on each stroke, grouping the stroke information in a certain classification unit, and one of storing and transmitting a message including the stroke information, grouping information and the input time information.

In accordance with an aspect of the present disclosure, a method of operating handwritten data is provided. The method includes receiving a message including stroke information corresponding to handwritten data and input time information of each stroke and displaying the stroke information based on the input time information included in a received message.

Other aspects, advantages, and salient features of the disclosure will become apparent to those skilled in the art from the following detailed description, which, taken in conjunction with the annexed drawings, discloses various embodiments of the present disclosure to be described.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "include" or "may include" that may be used in the present disclosure indicates the presence of a disclosed corresponding function, operation or component but does not exclude one or more functions, operations or components in addition. Also, in the present disclosure, it should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

In various embodiments of the present disclosure, the expression "or" or "at least one of A and/or B" includes any and all combinations of enumerated words. For example, the expression "A or B" or "at least one of A and/or B" may include A, B, or both A and B.

In the present disclosure, the expression "a first", "a second", "firstly", or "secondly" may modify various components of the present disclosure but does not limit corresponding components. For example, the expression above does not limit the order and/or importance of corresponding components. The expression above may be used to distinguish one component from another component. For example, without departing from the scope of rights of the present disclosure, a first component may be called a second component and similarly, the second component may also be called the first component.

When any component is referred to as being "associated", "connected" or "accessed"' to another component, it should be understood that the former may be directly connected or accessed to the latter, or there may be another component in between. On the contrary, when any component is referred to as being "directly connected" or "directly accessed" to another component, it should be understood that there may be no other component in between.

The terms used in the present disclosure are used only to describe specific embodiments and are not intended to limit the present disclosure. The terms in singular form may include the plural form unless otherwise specified.

Unless otherwise defined herein, all terms used herein including technical or scientific terms have the same meanings as those generally understood by a person skilled in the art. Terms defined in generally used dictionaries should be construed to have meanings matching contextual meanings in the conventional art and should not be construed as having an ideal or excessively formal meaning unless otherwise defined herein.

An electronic device according to the present disclosure may be a device that may support functions of inputting and outputting handwritten data. For example, the electronic device may include at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), an MP3 player, a mobile medical device, a camera, and a wearable device (e.g., a Head-Mounted-Device (HMD) such as electronic glasses, electronic clothing, an electronic bracelet, an electronic necklace, an electronic appcessory, an electronic tattoo, or a smart watch).

According to some embodiments, the electronic device may be a smart home appliance having functions of inputting and outputting handwritten data. The smart home appliance may include, for example, at least one of a TV, a DigitalVideo Disk (DVD) player, an audio set, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic frame.

According to some embodiments, the electronic device may include at least one of various medical devices (e.g., a Magnetic Resonance Angiography (MRA) device, a Magnetic Resonance Imaging (MRI) device, a Computed Tomography (CT) device, a camera, and an ultrasonicator), a navigation system, a Global Positioning System (GPS) receiver, an Event Data Recorder (EDR), a Flight Data Recorder (FDR), a car infotainment device, electronic equipment for a ship (e.g., a navigation device or gyro compass for a ship), avionics, a security device, a head unit for a vehicle, an industrial or home robot, a financial institution's Automated Teller Machine (ATM) or a store's Point Of Sales (POS) device.

According to some embodiments, the electronic device may include at least one of a portion of a building/structure or furniture including a sensor panel or a touch panel, an electronic board, an electronic signature receiving device, a projector, and various measurement devices (e.g., a water, electricity, gas or electric wave measurement device). The electronic device according to the present disclosure may be one or more combinations of the above-described various devices. Moreover, the electronic device according to the present disclosure may be a flexible device. Also, it is obvious that the electronic device according to the present disclosure is not limited to the above-described devices.

In the following, electronic devices according to various embodiments are discussed with reference to the accompanying drawings. The term "user" used in various embodiments may mean a person who uses an electronic device or a device (e.g., an artificial intelligence electronic device) that uses the electronic device.

Figure 1:
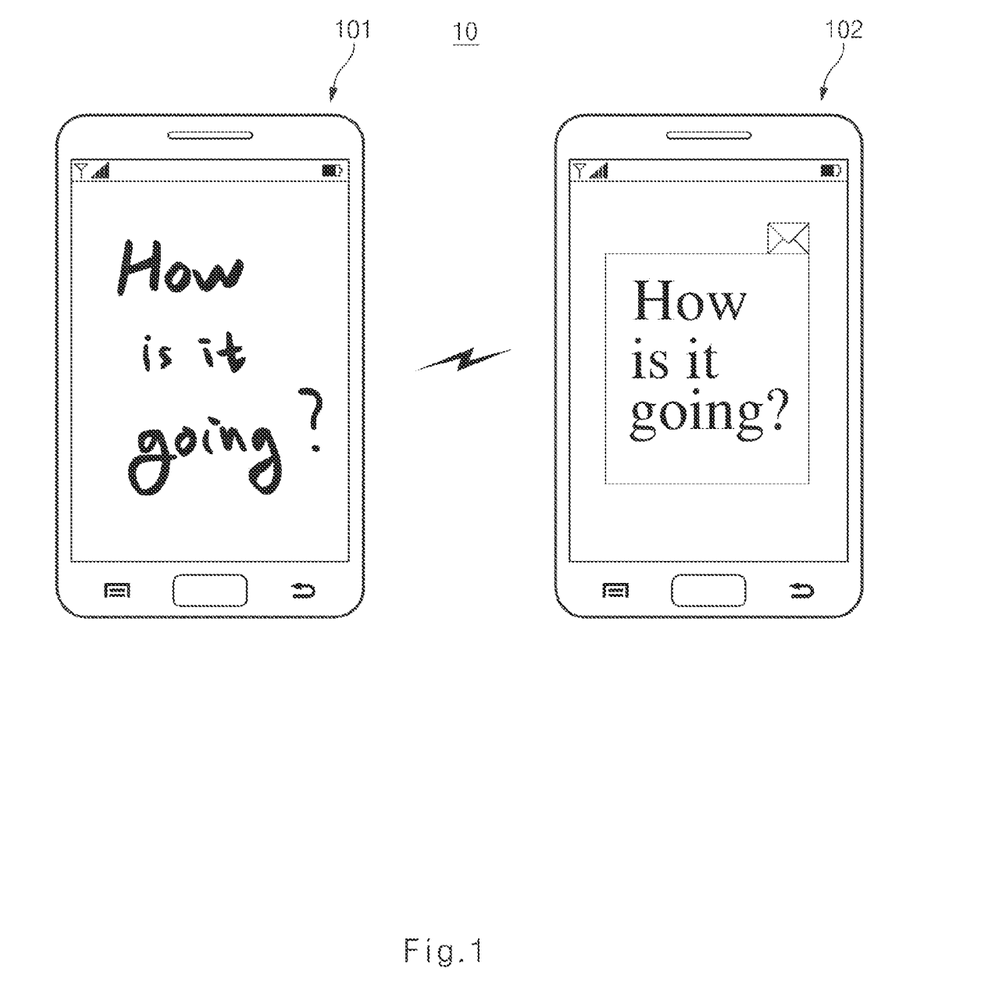
FIG. 1 illustrates a system for operating handwritten data according to an embodiment of the present disclosure.

FIG. 1 illustrates a system for operating handwritten data according to an embodiment of the present disclosure.

Referring to FIG. 1, a handwritten data operation system 10 of the present disclosure may include a first electronic device 101 and a second electronic device 102.

The first electronic device 101 may receive handwritten data and transmit input handwritten data to the second electronic device 102. Regarding this matter, the first electronic device 101 may include a display module used for inputting handwritten data and a communication module used for transmitting input handwritten data. According to an embodiment, the first electronic device 101 may collect time information when handwritten data is input. For example, the first electronic device 101 may collect at least one of information on when strokes forming characters are completed, information on when inputting characters is completed, information on when words or vocabularies are completed or information on when sentences are completed. Collected handwritten data and time information may be stored according to user control. In the process of displaying handwritten data, the time information may be used for determining when to display corresponding handwritten data. The first electronic device 101 may transmit, to the second electronic device 102, the time information related to handwritten data when transmitting input information.

According to various embodiments, the first electronic device 101 may collect information related to each stroke input when inputting handwritten data. For example, the first electronic device 101 may collect information on the direction, color, thickness and modification of a stroke, as information on an input shape related to stroke input. Thus, the first electronic device 101 may provide, to the second electronic device 102, information on the shape and order of the stroke input so that the second electronic device 102 reproduces the shape and order of a stroke when the input is performed. By such an operation, the first electronic device 101 may support the recognition of a handwriting input situation.

According to various embodiments, the first electronic device 101 may collect standard character data corresponding to a phoneme, a syllable, a morpheme and a word determined by recognizing a stroke. The standard character data may be Unicode or a character system (e.g., a font) installed in the first electronic device 101. As an example, the standard character data may include a standard character system such as a Times-New-Roman type, a Gothic type or an Arial type. Thus, the first electronic device 101 may detect a standard character corresponding to input handwritten data. The first electronic device 101 may transmit standard character data corresponding to handwritten data and time information to the second electronic device 102 when transmitting information.

The second electronic device 102 may receive handwritten data and time information from the first electronic device 101. The second electronic device 102 may display received handwritten data based on the time information. For example, the second electronic device 102 may display the input shape of a handwritten stroke included in handwritten data according to a time flow with reference to the time information. In this process, the second electronic device 102 may also display a modification in an input stroke. Alternatively, the second electronic device 102 may display a handwriting-based character, word or vocabulary included in handwritten data according to the time flow based on the time information.

According to various embodiments, the second electronic device 102 may receive standard character data and the time information from the first electronic device 101. The second electronic device 102 may display strokes of a standard character received from the first electronic device 101 according to the time flow based on the time information. Alternatively, the second electronic device 102 may display received standard character data in units of characters, words or vocabulary according to the time flow based on the time information.

As described above, the handwritten data operation system 10 according to various embodiments of the present disclosure displays handwritten data according to the time flow spent on input so that a user who inputs information may easily convey his or her feelings or mood. Also, the handwritten data operation system 10 according to various embodiments may convert handwritten data into standard character data and store or transmit code values corresponding to the stand character data and time information to minimize resource allocation in comparison to image processing.

Figure 2:
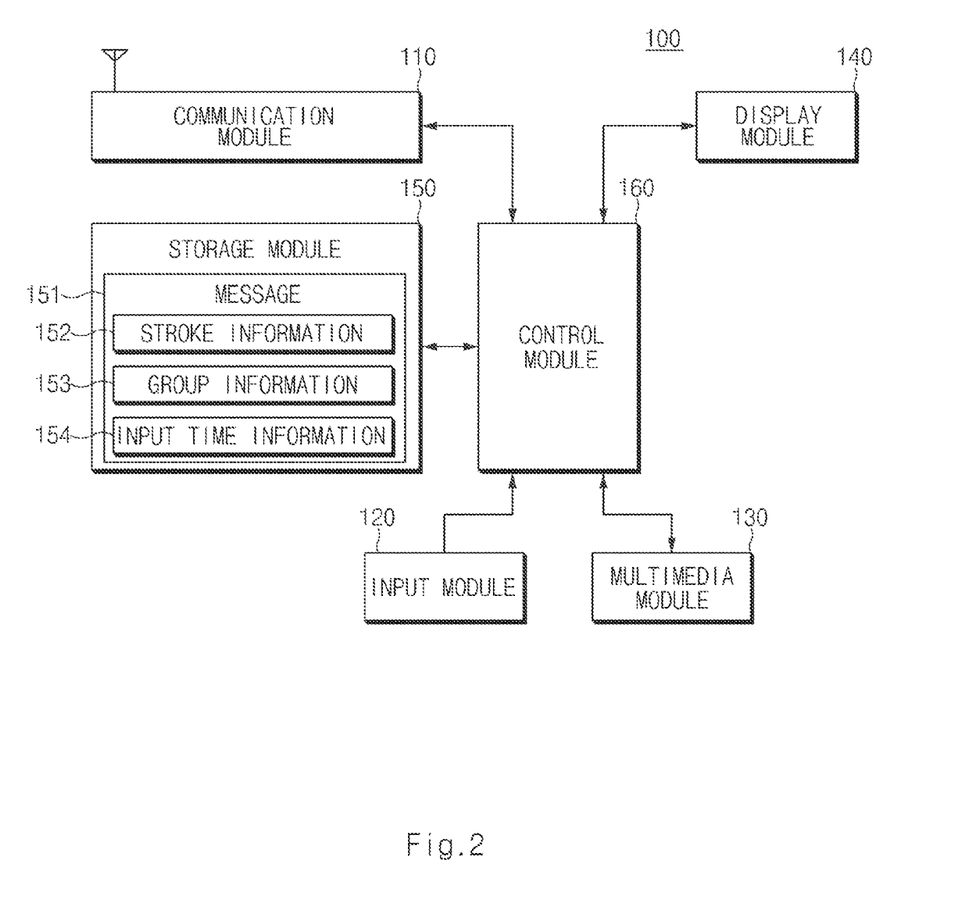
FIG. 2 illustrates an electronic device according to an embodiment of the present disclosure.

It has been described above that the first electronic device 101 has a function of inputting and transmitting handwritten data and the second electronic device 102 has a function of receiving and displaying the handwritten data. Various embodiments of the present disclosure are not limited to the above description. For example, the first electronic device 101 may function as the second electronic device 102 that receives and displays information and the second electronic device 102 may function as the first electronic device 101 that inputs and transmits information. In FIG. 2, reference number 100 is assigned to the first electronic device 101 and the second electronic device 102 which are called electronic devices, to provide descriptions related to operating handwritten data.

FIG. 2 illustrates an electronic device according to an embodiment of the present disclosure.

Referring to FIG. 2, an electronic device 100 may include a communication module 110, an input module 120, a multimedia module 130, a display module 140, a storage module 150, and a control module 160, but is not limited thereto.

The communication module 110 may include at least one communication unit related to the communication function of the electronic device 100. For example, the communication module 110 may include various communication units including a mobile communication unit, a broadcasting receiving unit such as a Digital Media Broadcasting (DMB) module or a Digital Video Broadcasting-Handheld (DVB-H) module, a short-range communication unit such as a Zigbee module being a Bluetooth module or a Near Field Communication (NFC) module, and a Wireless Fidelity (WiFi) communication unit. According to an embodiment, the communication module may transmit input handwritten data and time information to other electronic devices. Also, the communication module 110 may receive standard character data corresponding to the handwritten data and the time information in other electronic devices. According to various embodiments, the communication module 110 may receive handwritten data and the time information from the other electronic devices. Also, the communication module 110 may receive the standard character data corresponding to the handwritten data and the time information from the other electronic devices. The information received by the communication module 110 may be displayed on the display module 140 according to the control of the control module 160.

The input module 120 may generate an input signal of the electronic device 100. The input module may include at least one of a key pad, a dome switch, a (static pressure and capacitive) touch pad, a jog wheel, and a jog switch, for example. The input module 120 may be implemented as a button type module on the external surface of electronic device 100. According to an embodiment, the input module 120 may include a plurality of keys for receiving numeric or character data and setting various functions. Such keys may include a menu call key, a screen ON/OFF key, a power ON/OFF key, a volume control key, and/or a home key.

The input module 120 may generate a signal for requesting the activation of a function related to inputting handwritten data, an activated touch event related to inputting handwritten data, a signal for requesting the storage of input handwritten data and a signal for transmitting input handwritten data. Also, the input module 120 may generate an input signal that requests that the display module 140 display handwritten data when receiving the handwritten data, and an input signal that requests the storing or deleting of received handwritten data.

The multimedia module 130 may process the audio signal of the electronic device 100. For example, the multimedia module 130 may transmit an audio signal input from the control module 160 to a speaker. The multimedia module 130 may perform a function of carrying an audio signal such as voice input from a microphone to the control module 160. The multimedia module 130 may convert the audio signal such as voice received from the microphone into a digital signal and carry (or transfer) the digital signal to the control module 160.

According to an embodiment, the multimedia module 130 may provide a sound effect that corresponds to a touch event when handwritten data is input or provides notice that handwritten data is received. The multimedia module 130 may output audio data when the handwritten data includes it. Outputting the audio signal by the multimedia module 130 may be dropped according to a change in configuration that is performed by a user.

The display module 140 may display various screens corresponding to functions processed by the electronic device 100. For example, the display module 140 may display a standby screen, a menu screen or a locked screen. According to an embodiment, the display module 140 may display a screen for displaying an icon or menu item related to inputting handwritten data, a screen for inputting handwritten data, and a screen for transmitting input handwritten data. According to an embodiment, the display module 140 may display a screen related to receiving handwritten data and time information, a screen for displaying the handwritten data based on the time information, a screen related to receiving standard character data corresponding to the handwritten data and the time information, and a screen for displaying the standard character data based on the time information.

The display module 140 may support a screen display in a horizontal mode, a screen display in a vertical mode, and a screen switch display according to the change between the horizontal mode and the vertical mode, depending on the rotation direction (or placement direction) of the electronic device 100. The display module 140 may include at least one of a Liquid Crystal Display (LCD), a Thin Film Transistor-LCD (TFT LCD), a Light Emitting Diode (LED), an Organic LED (OLED), an Active Matrix OLED (AMO-LED), a flexible display, a bent display, and a 3D display. Some of these displays may be implemented as transparent displays that are transparent or optically transferable to enable viewing of the outside.

Also, the display module 140 may be provided as a touch screen including a display module and thus used as an input device in addition to an output device. The display module may be configured to convert a change in pressure applied to a specific part of the display module 140 or in capacitance generated from a specific part of the display module 140 into an electrical input signal. The display module 140 may be configured to be able to detect pressure when a touch is performed, in addition to a touched location and area. On the other hand, as previously mentioned, the display module 140 of the present disclosure may include a touch panel and a display panel. The touch panel may be placed on the display panel. The touch panel may be implemented as an add-on type panel in which the touch panel is placed on the display panel, an in-cell type panel or an on-cell type panel in which the touch panel is inserted in the display panel.

The touch panel carries a user input responsive to a user gesture relative to the display module 140, to the control module 160. Here, the user input caused by fingers or a touch unit such as a touch pen may include a touch, multiple touches, a tap, double taps, a long tap, tap and touch, drag, a flick, a press, pinch in, and pinch out. The above-described user inputs may be defined as handwriting inputs. For example, when touch events such as a tap, drag and a flick occur, the control module 160 may process the touch events as handwriting inputs corresponding to corresponding events. Also, the above-described user inputs may be defined and used as input events that activate or inactivate a handwriting information input function, a handwriting information output function, a handwriting information transmission function and so on.

The above-described display module 140 may further include a display module related to operating an electronic pen. For example, the display module 140 may further include an electromagnetic induction type display module when the electronic pen is of an electromagnetic induction type. The display module 140 may provide a touch event generated from the display module or the electromagnetic induction display module to the control module 160.

The storage module 150 may store data and various programs related to processing and controlling data associated with the operation of the electronic device 100. For example, the storage module 150 may store an operating system. According to an embodiment, the storage module 150 may include a program for processing handwritten data (hereinafter, referred to as a "handwritten data processing program"). The handwritten data processing program may support the functions of inputting handwritten data, analyzing strokes when the handwritten data is input, and grouping analyzed strokes. Also, the handwritten data processing program may support the collecting and processing of stroke input time information, time information related to analyzed strokes or representative time information of grouped strokes.

The storage module 150 may store a handwritten message 151. The handwritten message 151 may be a message that is received or generated by other electronic devices. The message 151 may include stroke information 152, group information 153, and input time information 154. The stroke information 152 may include at least one of pieces of stroke-related information such as a thickness, a color, an input speed, and a modification and a shape corresponding to a character when handwritten data is input. The group information 153 may be information corresponding to a phoneme, a syllable, a morpheme, a word, a vocabulary and so on that includes information on at least one stroke. The input time information 154 may include time information on when a stroke is generated, or time information when a phoneme, a syllable, a work, a vocabulary and so on are inputted.

The above-described storage module 150 may include, as a storage medium, at least one of memories including a flash memory type, hard disk type, micro type and card type (for example, Secure Digital (SD) card or eXtreme Digital (XD) card) memories, and other types of memories including a Random Access Memory (RAM), a Static RAM (SRAM), a Read-Only Memory (ROM), a Programmable ROM (PROM), an Electrically Erasable PROM (EEPROM), a Magnetic RAM (MRAM), a magnetic disk and an optical disk type memory. The electronic device 100 may also operate as a web storage that performs a storage function of the storage module 150 over the internet.

The control module 160 may process and carry (or transfer) data related to the operation of the electronic device 100, and process and carry a control signal. According to an embodiment, the control module 160 may support the input and storing of the handwritten data. Also, the control module 160 may support the transmission and output of the handwritten data.

Figure 3:
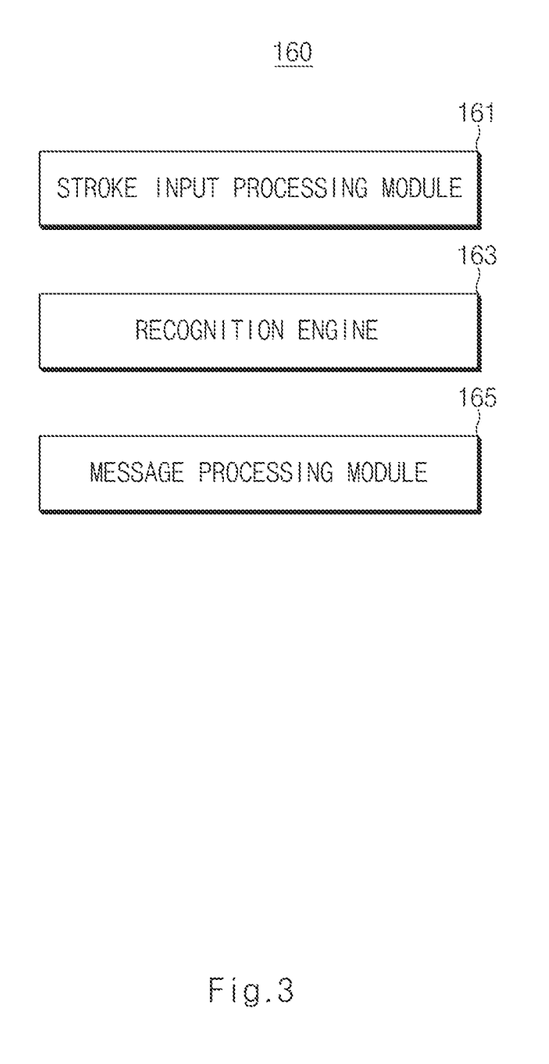
FIG. 3 illustrates a control module according to an embodiment of the present disclosure.

FIG. 3 represents a control module according to an embodiment of the present disclosure.

Referring to FIG. 3, the control module 160 according to an embodiment may include a stroke input processing module 161, a recognition engine 163 and a message processing module 165, but is not limited thereto.

The stroke input processing module 161 may display, on the display module 140, a handwritten data input screen corresponding to receiving an event related to activating the handwritten data input function. The stroke input processing module 161 may analyze a tap event, a drag event or a flick event input through the display module 140 and recognize a stroke. For example, when the drag event occurs after a touch-down event and a touch-release event occurs, the stroke input processing module 161 may determine that one stroke input is completed, collect corresponding touch events and carry (or transfer) the events to the recognition engine 163. In this process, the stroke input processing module 161 may carry, to the recognition engine 163, information such as location information on touch events, start and end time information on the touch events, the thickness of a touch, the color of an applied stroke, and the input speed of a stroke.

The recognition engine 163 may analyze a stroke input based on touch event-related information carried by the stroke input processing module 161. For example, the recognition engine 163 may recognize at least one of a phoneme, a syllable, a morpheme, a word and a vocabulary based on at least one stroke carried. According to an embodiment, the recognition engine 163 may recognize "T" including two strokes as one phoneme. Also, the recognition engine 163 may recognize "E" including four strokes as one phoneme. Also, the recognition engine 163 may recognize "K" including three strokes as one phoneme. According to various embodiments, the recognition engine 163 may recognize "THE" including a plurality of strokes as a morpheme or a word. Also, the recognition engine 163 may recognize "IS" including a plurality of strokes as a phoneme, a morpheme or a word. The recognition engine 163 may recognize "TREE" including a plurality of strokes as a word.

In the process of grouping at least one stroke and integrating it into a phoneme, a morpheme or a word, the recognition engine 163 may define grouping information on corresponding handwritten data. For example, the recognition engine 163 may define grouping information on which strokes input are grouped into a phoneme, a morpheme or a word, based on handwritten data. The recognition engine 163 may aggregate input time information on a plurality of strokes grouped and carry the information to the message processing module 165. In this process, the recognition engine 163 may define time information related to the stroke of a first of the plurality of strokes grouped, as representative input time information. Alternatively, the recognition engine 163 may define time information related to the stroke of a last of the plurality of strokes grouped, as representative input time information.

According to an embodiment, the recognition engine 163 may perform corresponding coded standard character conversion on the plurality of strokes grouped. For example, the recognition engine 163 may convert a handwritten phoneme into a coded standard character phoneme. The recognition engine 163 may convert a handwritten morpheme or word into a coded standard character morpheme or word. The recognition engine 163 may define time information on at least one stroke corresponding to coded standard character data. The recognition engine 163 may carry standard character data and time information to the message processing module 165.

The message processing module 165 may generate a handwritten message based on representative input time information and information on a plurality of strokes grouped into a phoneme, a syllable, a morpheme or a word carried by the recognition engine 163. The message processing module 165 may store a generated message in the storage module 150. Also, the message processing module 165 may control the generated message to be transmitted to other electronic devices.

According to an embodiment, the message processing module 165 may control to be displayed a message received from other electronic device or a pre-stored message 151 on the display module 140. In this process, the message processing module 165 may check input time information and display strokes in the order of input time information. Alternatively, the message processing module 165 may check representative input time information and enable a display to be performed in a grouped-stroke unit such as a phoneme unit, a syllable unit, a syllable unit, a morpheme unit, a word unit or a vocabulary unit. In this case, the message processing module 165 may control to be displayed handwritten data in a grouped-stroke unit on the display module 140 based on representative input time information. Alternatively, the message processing module 165 may control to be displayed coded standard character data in a grouped-stroke unit on the display module 140 based on representative input time information. In this process, the message processing module 165 may control the display time of at least one stroke so that the stroke is displayed over a pre-defined time period. For example, the message processing module 165 may control to be displayed at least one stroke or a plurality of strokes grouped without separate time consumption or a time spent in making a stroke from a certain start point to an end point to be a preset time, such as 0.5 second or one second. In this example, the preset time may also become longer or shorter than specified reference time based on input time information related to the plurality of strokes grouped.

As described above, the electronic device 100 supporting the handwritten data operation according to various embodiments of the present disclosure may collect input time information when handwritten data is generated, illustrate at which interval information is input, and provided various feelings appearing when information is input. Also, the electronic device 100 according to various embodiments may convert handwritten data into coded standard character data, minimize an amount of information to be stored or transmitted and align, based on input time information, a time at which at least one stroke is displayed, thereby enabling a message having various feelings to be carried.

On the other hand, various embodiments described in the present disclosure may be implemented in a recording medium that may be read with a computer or a similar device by using software, hardware or a combination thereof. According to a hardware implementation, the embodiments described in the present disclosure may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and other electrical units for performing functions. In some cases, the embodiments described in the specification may be implanted as the control module 160 itself. According to a software implementation, embodiments such as the procedures and functions described in the specification may be implemented in separate software modules. Each of the software modules may perform one or more functions and operations that are described in the specification.

According to various embodiments, the control module 160 of the above-described electronic device 100 may include a bus and at least one processor. Here, the processor may include, for example, at least one of the processing modules and engine described with respect to the electronic device 100.

The bus may be circuits that connect components (for example, processors, storage modules, input modules, display modules or communication modules) included in electronic devices and that deliver communication (for example, control messages) between the components.

The processor may receive commands through the bus from the components included in the electronic devices, decrypt the received commands and perform calculation or data processing according to the decrypted commands. For example, the processor executes at least one application stored in the storage module 150 and provides a service based on a corresponding application.

Also, the processor may include one or more Application Processors (APs) or one or more Communication Processors (CPs). In this example, the AP or the CP may be included in a processor or they may be included in different Integrated Chip (IC) packages respectively. Also, the AP or the CP may also be included in one IC package. The AP may execute operating system or application programs to control a plurality of hardware and software components connected to the AP and may perform processing and calculation on various data including multimedia data. In this example, the AP may be implanted as a System on Chip (SoC). Also, the CP may perform at least some of multimedia control functions. Also, the CP may use a subscriber identification module (for example, SIM card) to identify and authenticate terminals in a communication network. In this case, the CP may provide a service including voice call, video call, text message or packet data service. Also, the CP may perform the data transmission/reception of the communication module 110. The AP or the CP may load, on volatile memories, commands or data read from non-volatile memories connected to the AP or the CP or from at least one of other components and may process the commands or data. Also the AP or the CP may store, in non-volatile memories, data received from at least one of other components or generated by at least one of other components. The CP may manage a data link when communicating between other electronic devices connected to an electronic device over a network, and perform a function to convert a communication protocol. In this example, the CP may be implanted as a SoC. Further, the processor may further include a Graphic Processing Unit (GPU).

As described above, the electronic device 100 according to various embodiments may include the display module 140 generating an event corresponding to a handwritten data input, and the control module 160 that recognize a stroke from handwritten data, collects input time information on at least one stroke and stores or transmits the message 151 including the stroke and the input time information.

According to various embodiments, the control module 160 may perform a control operation to include information on at least one of the input shape, input speed and modified state of the stroke, and the time interval between strokes.

According to various embodiments, the control module 160 may perform a control operation to group the strokes into at least one of a phoneme unit, a syllable unit, a morpheme unit, a word unit, a vocabulary unit, and a character unit and to include the representative input time information of at least one stroke grouped and grouping information in the message 151.

According to various embodiments, the control module 160 may convert each stroke included in the handwritten data into coded standard character data corresponding to each stroke, group strokes corresponding to the standard character data obtained though conversion into at least one of a phoneme unit, a syllable unit, a morpheme unit, a word unit, a vocabulary unit, and a sentence unit, and determine the representative input time information of at least one stroke grouped.

According to various embodiments, the control module 160 may control a change in at least one of the order of each stroke included in the handwritten data, the display time of each stroke included in the handwritten data, and the display time interval between strokes.

The electronic device 100 according to various embodiments may include the communication module 110 receiving a message including information on at least one stroke included in handwritten data, and input time information on each stroke, the control module 160 enabling each stroke to be displayed based on the input time information, and the display module 140 displaying strokes.

According to various embodiments, the control module 160 may enable the handwritten data to be displayed on the display module 140 according to the input shape, input speed and modified state of the stroke included in the stroke information 152, and the time interval between strokes According to various embodiments, the communication module 110 may receive grouping information related to grouping at least one stroke, and the control module 160 may perform a control operation so that the handwritten data is displayed in unit of the at least one stroke grouped at a certain time interval.

According to various embodiments, the control module 160, the control module 160 may perform a control operation so that the at least one stroke grouped is displayed in unit of at least one of a phoneme, a syllable, a morpheme, a word, a vocabulary and a sentence.

According to various embodiments, the control module 160 may convert handwritten stroke information into coded standard character data.

Figure 4:
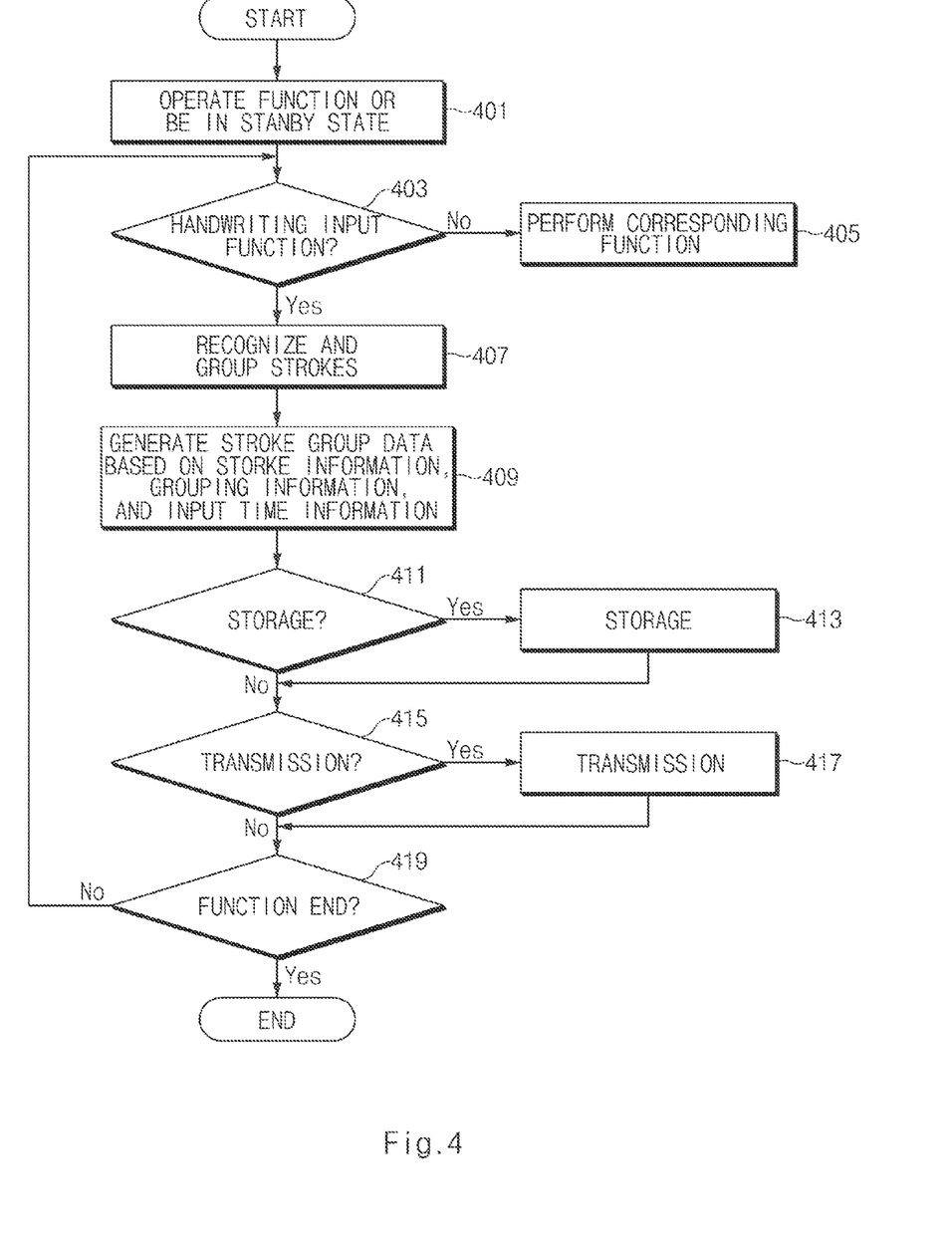
FIG. 4 illustrates an input and storing or transmission method while operating handwritten data according to an embodiment of the present disclosure.

FIG. 4 illustrates an input and storing or transmission method while operating handwritten data according to an embodiment of the present disclosure.

Referring to FIG. 4, in a method of operating handwritten data according to an embodiment, the control module 160 may perform any function or be in a standby state (or idle state) in operation 401. For example, the control module 160 may control the electronic device 100 so that a specific application is executed, a sleep mode (for example, a state that the display module is turn off) is supported, or a locked screen state is maintained. Alternatively, the control module 160 may control the display of an icon or menu item related to a handwriting input function.

When a specific event occurs, the control module 160 may check whether the event is related to the handwriting input function, in operation 403. When the event is not related to the handwriting input function, the control module 160 may perform a control operation so that a function corresponding to the event is performed, in operation 405. For example, the control module 160 may control the electronic device 100 so that a new application corresponding to the type or characteristic of the event is executed or the specific function of an application being executed is performed. Alternatively, the control module 160 may negate a sleep mode state or a locked screen state according to the type of the event.

When a handwriting input function related event occurs in operation 403, the control module 160 may activate the handwriting input function. The control module 160 may recognize and group strokes according to the occurrence of an input event in operation 407. For example, the control module 160 may check which stroke (e.g., at least one of having an input shape, an input speed and a modified state) occurs, through analysis on the drag event between a point where a touch-down event occurs and a point where a touch-release event occurs. The control module 160 may collect information (e.g., at least one of an input shape, an input speed, and a modified state) related to a handwritten stroke.

The control module 160 may group at least one stroke into a phoneme, a syllable, a morpheme, a word, a vocabulary and a sentence based on the operation of the recognition engine 163. In this process, the control module 160 may collect input time information on when at least one stroke is input. The input time information on the stroke may be information on at least one time point between a stroke start time and a stroke end time.

In operation 409, the control module 160 may generate stroke group data based on stroke information 152, grouping information 153 on at least one stroke, and input time information 154 that are recognized through analysis on touch events. In this example, the control module 160 may convert a handwritten stroke into coded standard character data. According to various embodiments, the coded standard character data may include a special symbol, a special character for punctuation marks, and an emoticon in addition to a specific symbol or character. Also, the coded standard character data may include pre-coded image information corresponding to the specific character or symbol. Thus, the stroke group data may also include standard character data and input time information.

In operation 411, the control module 160 may check whether there is a storage related event. The control module 160 may store the stroke group data as the message 151 in the storage module 150 in operation 413, when there is the storage related event. In this process, the control module 160 may store the message 151 that includes information on at least one handwritten stroke, its grouping information, and its input time information. Alternatively, the control module 160 may store the message 151 that includes information on at least one stroke corresponding to a coded standard character, its grouping information, and its input time information.

In operation 415, as a transmission related event is generated, the control module 160 may transmit the stroke group data as a message to other electronic devices in operation 417. The message transmitted to the other electronic devices may include the stroke group data including information on a handwritten stroke, its grouping information, and its input time information. Alternatively, the message may include the information on the at least one stroke corresponding to the coded standard character, its grouping information, and its input time information. The method of operating handwritten data according to various embodiments is not limited to the storage order and the transmission order described above. For example, in the method of operating handwritten data, the storage operation may also be performed earlier than the transmission operation, or the transmission operation may also be performed later than the storage operation. Also, in the method of operating handwritten data, the transmission operation may be performed without the storage operation, or only the storage operation may also be performed without the transmission operation.

The control module 160 may check whether there is an input event related to a handwriting input function end in operation 419. In this process, when a handwriting input function is maintained, the control module 160 may return to operation 403 and re-perform operations following operation 403. When a handwriting input function end related event occurs, the control module 160 may inactivate the handwriting input function. For example, the control module 160 may display an input box related to the handwriting input function.

Figure 5:
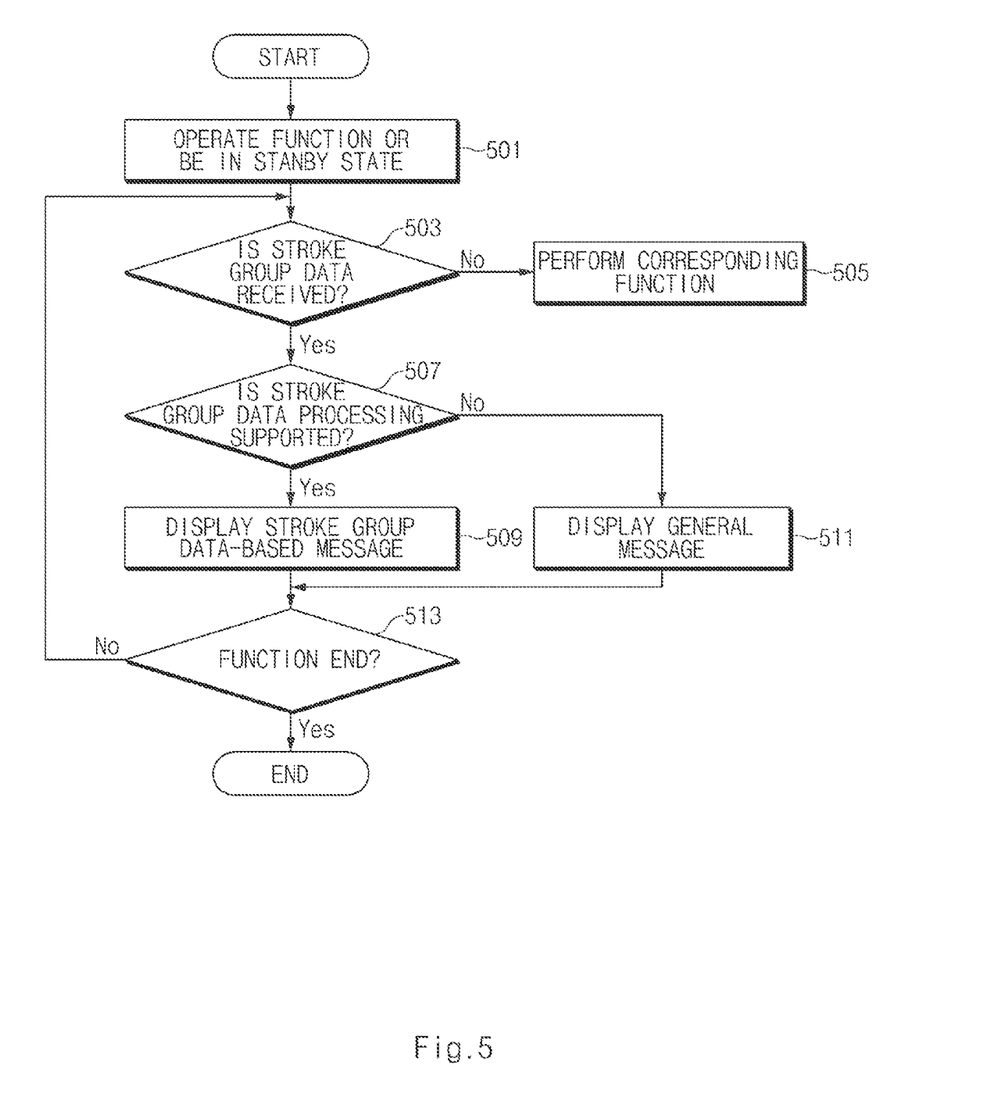
FIG. 5 illustrates a method of receiving handwritten data according to an embodiment of the present disclosure.

FIG. 5 illustrates a method of receiving handwritten data according to an embodiment of the present disclosure.

Referring to FIG. 5, in the method of receiving handwritten data according to an embodiment, the control module 160 may operate a function or be in a standby state (or idle state). The control module 160 may check whether stroke group data is received in operation 503. When the stroke group data is not received, the control module 160 may proceed to operation 505 and support the processing of received data, the processing of a function according to an input event, or the operation control or standby of a function being already performed.

When the stroke group data is received, the control module 160 may check whether stroke group data processing is supported in operation 507. The control module 160 may output a general message in operation 511 when it is difficult to support the stroke group data processing or there is no setting related to the stroke group data processing. For example, the control module 160 may output a message without considering time information based on coded standard character data included in the stroke group data. In this example, the control module 160 may output a message that there is an error in outputting information, when the stroke group data includes only the information on the handwritten stroke.

When there is a setting related to supporting the stroke group data processing or a support requesting event occurs, the control module 160 may output a message based on the stroke group data in operation 509. According to an embodiment, the control module 160 may check at least one of pieces of information on the input shape, input speed, or modified state of a stroke and the time interval between strokes, from stroke related information that is included in the stroke group data. The control module 160 may perform a control operation so that strokes included in a message are displayed on the display module 140 based on the stroke related information. According to various embodiments, the control module 160 may control the display time of at least one stroke based on input time information included in stroke group data. In this case, at least one stroke displayed may be in a stroke unit, a phoneme unit, a syllable unit, a word unit, a vocabulary unit, or a character unit based on a time. Also, at least one stroke displayed may be at least one of a handwritten stroke and a stroke corresponding to a coded standard character. The control module 160 may convert handwritten strokes into coded standard characters when the message display setting of the electronic device 100 takes a coded standard character display scheme. The control module 160 may perform a control operation so that at least one stroke corresponding to the standard character obtained through conversion is displayed with a time interval or a time delay according to input time information.

The control module 160 may check whether there is an event related to a function end in operation 513. When the function end related event occurs, the control module 160 may control processes so that a message display is ended and a return to a previous state is performed. The control module 160 may return to operation 503 and re-perform processes following operation 503, when there is no function end related event.

As described above, the method of operating handwritten data according to various embodiments may include the operation of collecting stroke information 152 on handwritten data and input time information 154 on each stroke, grouping the stroke information in a certain classification unit, and storing or transmitting a message including the stroke information 152, grouping information 153 and the input time information 154.

According to various embodiments, the grouping operation may include the operation of grouping the stroke information 152 in at least one of phoneme, syllable, morpheme, word, vocabulary and sentence units, and the operation of determining specific time information from input time information of each stroke as representative input time information.

According to various embodiments, the method may further include the operation of converting the stroke information into coded standard character data, and the grouping operation may include the operation of grouping strokes corresponding to the coded standard character data in the classification unit.

According to various embodiments, the method may further include the operation of changing the display order of strokes included in the handwritten data according to an input event.

According to various embodiments, the method may further include the operation of changing at least one of the display time of each stroke included in the handwritten data and the display time interval between strokes according to an input event.

The method of operating handwritten data according to various embodiments may include the operation of receiving a message including stroke information corresponding to handwritten data and input time information on each stroke, and the operation of displaying the stroke information based on the input time information included in a received message.

According to various embodiments, the receiving operation may further include the operation of receiving grouping information that the stroke information is grouped in a certain classification unit.

According to various embodiments, the displaying operation may include the operation of displaying grouped strokes in at least one of phoneme, syllable, morpheme, word, vocabulary and sentence units based on the input time information.

According to various embodiments, the displaying operation may include at least one of the operation of displaying handwritten strokes and the operation of displaying coded standard character data corresponding to handwritten stroke information.

According to various embodiments, the method may further include at least one of the operation of storing the received message and the operation of again displaying a stored message according to the input time information when there is a request for again display the stored message.

Figure 6:
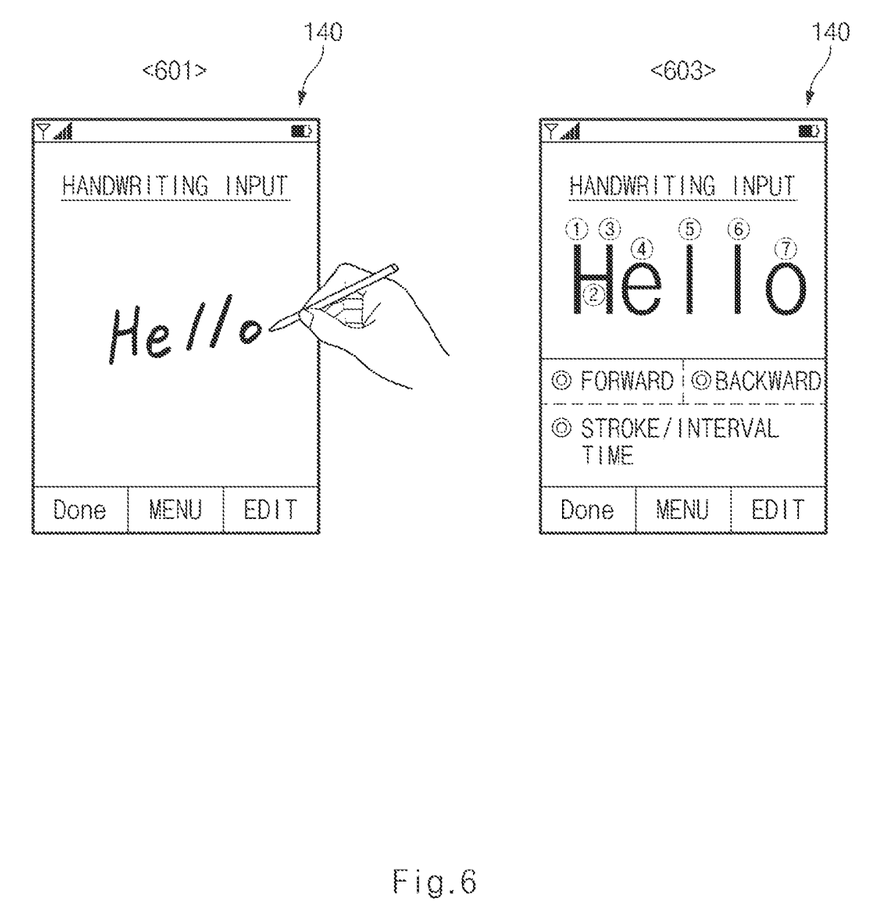
FIG. 6 illustrates a screen interface related to editing handwritten data according to an embodiment of the present disclosure.

FIG. 6 is a screen interface related to editing handwritten data according to an embodiment of the present disclosure.

Referring to FIG. 6, the display module 140 may display a screen related to inputting handwritten data as illustrated in a screen 601 or display the message 151 including stroke group data stored in the storage module 150. The display module 140 may display an item related to a function of editing input handwritten data. The control module 160 may convert e.g., handwritten data "Hello" into coded standard character data "Hello" when a handwritten data input is performed.

When an item related to editing handwritten data is selected or a defined editing function activation related event occurs, the display module 140 may display a handwriting editing screen as illustrated in a screen 603. The display module 140 may display order information on handwritten data when the handwriting editing function is activated. For example, the display module 140 may display time order information on "Hello". For example, the display module 140 may display the numbers 1 to 3 corresponding to stroke time information on the letter "H", the number 4 for time information on the letter "e", the numbers 5 and 6 for time information on the letters "ll", and the number 7 for time information on the letter "o". The numbers "1 to 7" corresponding to time order information may mean the order in which each letter is displayed. Also, the control module 160 may perform a control operation so that each letter is displayed according to a time order. In this process, the control module 160 may check information on the time interval between letters and perform a control operation so that strokes are displayed with a certain time delay. According to an embodiment, the display time interval between the letter "e" and the letter "l" may be different from the time interval between the letter "l" and the letter "o". Thus, the control module 160 may control the electronic device 100 or the display module 140 so that the letter "l" is displayed at a first time interval after displaying the letter "e", and the letter "o" is displayed at a second time interval after the letter "l" is displayed.

According to various embodiments, the display module 140 may display an item that may change the display order of strokes as illustrated. For example, the display module 140 may include items "Forward" and "Backward". The "Forward" may correspond to the order in which strokes are input, and the "Backward" may be opposite to the order in which strokes are input. When the "Backward" is selected, the control module 160 may adjust a message display order so that a corresponding message is displayed from the letter "o".

According to various embodiments, the display module 140 may include an item "Stroke/Time Interval" as illustrated. The item "Stroke/Time Interval" may be used for adjusting a time that is spent in outputting strokes. Also, the item "Stroke/Time Interval" may be used for adjusting a time interval between strokes.

Although adjusting a group of strokes for a word "Hello" is described above, the control module 160 according to various embodiments may support an adjustment in a stroke unit, a word unit, or a sentence unit. Although it is described above that in an editing operation, the stroke display direction and time of coded standard character data are changed, the control module 160 may also support changing the stroke display direction and time of handwritten data.

Figure 7:
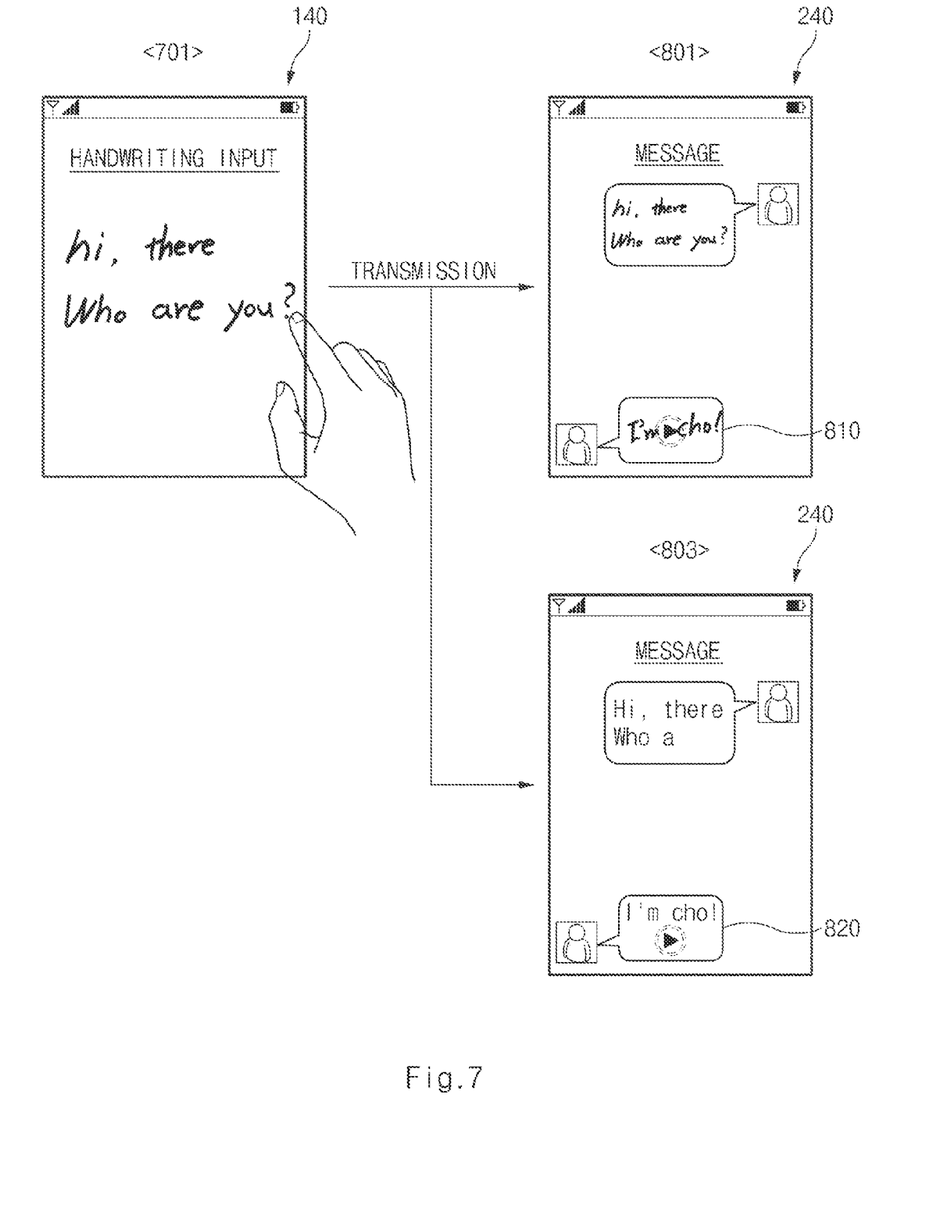
FIG. 7 illustrates a screen interface related to operating handwritten data according to an embodiment of the present disclosure.

FIG. 7 is a screen interface related to operating handwritten data according to an embodiment of the present disclosure.

Referring to FIG. 7, the display module 140 may support a handwriting input as illustrated in a screen 701. In this process, the display module 140 may display an input box related to a handwriting input. A user may use his or her finger or an electronic pen to input handwritten data "Hi, there. Who are you?" as illustrated in FIG. 7. The control module 160 may transmit input handwritten information to other electronic devices when a handwritten data input based on a message transmission function is performed.

When a handwritten data based message is received, the other electronic devices may display received handwritten data in a certain area as illustrated on a screen 801. For example, a second display module 240 may display handwritten data in a phoneme unit or in a stroke unit on the screen 801. Thus, as illustrated in FIG. 7, the second display module 240 may display "Hi, there. Who a . . . " at a certain time interval or with a certain time delay based on time information obtained in the process in which handwritten information is input.

According to various embodiments, the other electronic devices may display a received message on the second display module 240 as illustrated on a screen 803, when a handwritten data based message is received. In this case, the electronic device 100 transmitting the message may transmit handwritten data as coded standard character data. The second display module 240 may display the coded standard character data with a certain time delay based on time information as illustrated in FIG. 7. According to various embodiments, after receiving the handwritten data based message, the other electronic devices may also convert received handwritten data into a coded standard character and display the coded standard character as illustrated on the screen 803.

According to various embodiments, the second display module 240 of the other electronic device may support re-displaying the handwritten data based message with a time delay after displaying the message. For example, when an event to select a first item 810 or a second item 820 from the screen 801 or the screen 803 occurs, the control module 160 may perform a control operation so that the strokes of corresponding information are displayed with a time delay according to time information.

On the other hand, many variations may be made due to the convergence trend of digital devices and thus entire enumerations may not be made but the electronic device 100 may further include components not mentioned above, such as an acceleration sensor, a gyro sensor, a GPS module, a NFC module, a vibration motor, an accessory, and the like. Also, for the electronic device 100, specific components may be removed from components above or be replaced with other components depending on the situation.

According to the method of operating handwritten data and the electronic device supporting same that are proposed in various embodiments of the present disclosure as described above, various embodiments of the preset disclosure may enable information having various feelings to be carried.

Also, various embodiments of the present disclosure may enable the efficient operation of a resource required for storing and transmitting handwritten data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display module configured to generate an event corresponding to a handwritten data input;
   a memory configured to store a message or information;
   a communication module; and
   a processor configured to electrically connected to the display module, the memory and the communication module,
   wherein the processor is configured to:
      collect input time information on at least one stroke of a handwritten data when the handwritten data input occurs,
      convert each stroke included in the handwritten data into coded standard character data, and
      transmit the message to another electronic device through a communication channel established by the communication module,
   wherein the message includes coded standard character data corresponding to the at least one of stroke and the input time information associated with the coded standard character data.

2. The electronic device according to claim 1, wherein the processor is further configured to group strokes corresponding to the standard character data obtained through conversion in at least one of phoneme, syllable, morpheme, word, vocabulary or sentence units, and to determine representative input time information on at least one stroke grouped.

3. The electronic device according to claim 1, wherein the processor is further configured to change at least one of an order of each coded standard character data, a display time of each stroke included in the handwritten data, or the display time interval between coded standard character data.

4. An electronic device comprising:
   a memory configured to store a message comprising coded standard character data corresponding to the at least one of each stroke of handwritten data and a input time information associated with the coded standard character data;
   a display module configured to display the coded standard character data; and
   a processor configured to be electrically connected to the memory and the display module,
   wherein the processor is configured to display each of the coded standard character data based on the input time information.

5. The electronic device according to claim 4, further comprises:
   a communication module configured to receive grouping information in that the coded standard character data is grouped, and
   wherein the processor is further configured to display the coded standard character data grouped according to a certain time interval.

6. The electronic device according to claim 5, wherein the processor is further configured to display the coded standard character data grouped in at least one of phoneme, syllable, morpheme, word, vocabulary, or sentence units based on the input time information.

7. A method of operating handwritten data, the method comprising:

collecting, by an electronic device, stroke information on handwritten data, and input time information on each stroke;

converting, by the electronic device, each stroke into coded standard character data;

grouping, by an electronic device, the coded standard character data in a certain classification unit; and transmitting, by the electronic device, a message to another electronic device through a communication channel, wherein the message includes the coded standard character data, grouping information and the input time information.

8. The method according to claim 7, wherein the grouping of the coded standard character data in the certain classification unit comprises:

grouping, by the electronic device, the coded standard character data in at least one of phoneme, syllable, morpheme, word, vocabulary, or sentence units; and determining, by the electronic device, specific time information from input time information on each coded standard character data as representative input time information.

9. The method according to claim 7, further comprising:

changing, by the display device, the display order of each coded standard character data according to an input event.

10. The method according to claim 7, further comprising:

changing, by the display device, at least one of a display time of each coded standard character data, a display time interval between coded standard character data according to an input event, a coded standard character data display direction, or the input time information of each coded standard character data.

11. A method of operating handwritten data, the method comprising:

receiving, by an electronic device, a message including coded standard character data corresponding to the at least one of each stroke of handwritten data and a input time information associated with the coded standard character data; and displaying, by the electronic device, the coded standard character data based on the input time information included in a received message.

12. The method according to claim 11, wherein the message comprises receiving grouped information in which the coded standard character data is grouped in a certain classification unit.

13. The method according to claim 12, wherein the displaying of the message comprises displaying grouped coded standard character data in at least one of phoneme, syllable, morpheme, word, vocabulary, or sentence units based on the input time information.

14. The method according to claim 11, further comprising at least one of:

storing, by the electronic device, the received message; and re-displaying, by the electronic device, a stored message according to the input time information when there is a request to again display the stored message.

* * * * *